United States Patent
Houraiya

(10) Patent No.: US 10,737,656 B2
(45) Date of Patent: Aug. 11, 2020

(54) FABRIC FOR AIR BAG AND AIR BAG

(71) Applicant: SEIREN CO., LTD., Fukui-shi, Fukui (JP)

(72) Inventor: Tsuyoshi Houraiya, Fukui (JP)

(73) Assignee: SEIREN CO., LTD., Fukui-Shi (JP)

( * ) Notice: Subject to any disclaimer, the term of this patent is extended or adjusted under 35 U.S.C. 154(b) by 4 days.

(21) Appl. No.: 15/764,701

(22) PCT Filed: Sep. 26, 2016

(86) PCT No.: PCT/JP2016/078325
§ 371 (c)(1),
(2) Date: Mar. 29, 2018

(87) PCT Pub. No.: WO2017/057300
PCT Pub. Date: Apr. 6, 2017

(65) Prior Publication Data
US 2018/0281737 A1    Oct. 4, 2018

(30) Foreign Application Priority Data
Sep. 30, 2015 (JP) .................... 2015-193865

(51) Int. Cl.
*B60R 21/235* (2006.01)
*D03D 1/02* (2006.01)

(52) U.S. Cl.
CPC ............. *B60R 21/235* (2013.01); *D03D 1/02* (2013.01); *D10B 2321/0211* (2013.01); *D10B 2331/02* (2013.01); *D10B 2331/061* (2013.01); *D10B 2401/061* (2013.01); *D10B 2401/063* (2013.01); *D10B 2505/124* (2013.01)

(58) Field of Classification Search
CPC ................................................ B60R 21/235; D03D 1/02; D10B 2321/0211; D10B 2331/061; D10B 2401/061; D10B 2401/063; D10B 2505/124
See application file for complete search history.

(56) References Cited

U.S. PATENT DOCUMENTS

| | | |
|---|---|---|
| 5,540,965 A | 7/1996 | Nishimura et al. |
| 2004/0036262 A1 | 2/2004 | Kanuma et al. |
| 2010/0253047 A1 | 10/2010 | Youn et al. |
| 2012/0040167 A1 | 2/2012 | Kim et al. |
| 2012/0280480 A1 | 11/2012 | Kwak et al. |

FOREIGN PATENT DOCUMENTS

| | | |
|---|---|---|
| CN | 101275326 A | 10/2008 |
| CN | 101861417 A | 10/2010 |
| CN | 102019902 A | 4/2011 |
| CN | 102695633 A | 9/2012 |
| CN | 103669015 A | 3/2014 |
| CN | 104060366 A | 9/2014 |
| EP | 0529371 A1 | 3/1993 |
| EP | 0682136 A1 | 11/1995 |
| JP | 2007-262648 A | 10/2007 |
| JP | 2010-203023 A | 9/2010 |
| JP | 2011-058132 A | 3/2011 |
| JP | 2012-524173 A | 10/2012 |
| JP | 2013-023784 A | 2/2013 |
| JP | 2014-181430 A | 9/2014 |
| WO | WO 95/10652 A1 | 4/1995 |

OTHER PUBLICATIONS

International Search Report for PCT/JP2016/078325 (PCT/ISA/210) dated Dec. 20, 2016.
Chinese Office Action and Search Report, dated Aug. 12, 2019, for Chinese Application No. 201680059177.6, with an English translation.
Chinese Office Action for Chinese Application No. 201680059177.6, dated Mar. 13, 2020, with English translation.

*Primary Examiner* — Arti Singh-Pandey
(74) *Attorney, Agent, or Firm* — Birch, Stewart, Kolasch & Birch, LLP

(57) ABSTRACT

Provided is a fabric for an air bag that is constituted by synthetic fibers, and the warp and the weft of the fabric have a tensile strength of 600 N/cm or more, an air flow rate of the fabric under a differential pressure of 20 kPa is 1.0 L/cm²·min or less, and an average stress of the warp and the weft that is required to additionally elongate the fabric from a 1.0% elongation state to a 3.0% elongation state is 15 N/cm or more, and an average stress of the warp and the weft that is required to additionally elongate the fabric from the 3.0% elongation state to a 5.0% elongation state is 15 N/cm or more.

5 Claims, 5 Drawing Sheets

FABRIC FOR AIR BAG AND AIR BAG

TECHNICAL FIELD

The present invention relates to a fabric used in an air bag that is practically used as an occupant protection device at the time of automobile collision, and to an air bag obtained from the same.

BACKGROUND ART

An air bag device is widely provided in a vehicle as a safety device for occupant protection that protects an occupant from impact when a vehicle undergoes collision. In recent years, an air bag device needs to be compact and light in weight, and accordingly, the size of an inflator has been reduced. As a result, the gas production amount decreases, and thus a highly-airtight air bag with little loss of gas is required.

In order to meet such a demand, it is important to suppress gas leakage from the surface of an air bag. Fabric made from synthetic fibers is mainly used as the material of an air bag, and there are gaps to some extent between threads that constitute the fabric. Furthermore, when gas is supplied from the inflator and the pressure inside the air bag increases, there is a possibility that these gaps will enlarge and as a result, and gas will tend to leak.

Also, it is known that the output of the inflator increases by being heated, and the output thereof increases due to the inflator being placed in a high temperature environment such as summer after the inflator is provided in a vehicle. Furthermore, there is also a concern that the load on the air bag increases due to an increase in the output, causing an accident such as burst, and thus a sufficient strength is also required.

For example, Patent Literature 1 discloses a method by which a fabric with gas permeability suitable for an air bag is obtained by controlling elongation in response to stress of the raw yarn that constitutes the fabric. However, the physical properties change depending on the weaving process and thermal history and stress history in the working process, and thus even though the elongation in response to stress of the raw yarn is controlled, it cannot be said that the elongation is similar in the fabric state, and control is not sufficient.

Also, Patent Literature 2 discloses a method in which elongation under a stress of 300 N/cm is set to a warp/weft total of 40% or more in order to reduce the load applied to stitches and prevent gas leakage. However, gaps between threads of an easily-stretchable fabric enlarge easily, and there is a risk that gas leakage from portions other than stitches will increase.

CITATION LIST

Patent Literature

Patent Literature 1: JP 2012-524173A
Patent Literature 2: JP 2013-23784A

SUMMARY OF INVENTION

Technical Problem

An object of the present invention is to provide a fabric for an air bag that has a sufficient strength and gas impermeability that are required as an air bag, and in which threads that constitute the fabric are unlikely to enlarge even when the inside of the airbag has a high pressure, and to provide an air bag that is constituted by this fabric for an air bag.

Solution to Problem

Namely, a fabric for an air bag of the present invention is constituted by synthetic fibers, and the warp and the weft of the fabric have a tensile strength of 600 N/cm or more, an air flow rate under a differential pressure of 20 kPa is 1.0 $L/cm^2 \cdot min$ or less, an average stress of the warp and the weft that is required to additionally elongate the fabric from a 1.0% elongation state to a 3.0% elongation state is 15 N/cm or more, and an average stress of the warp and the weft that is required to additionally elongate the fabric from the 3.0% elongation state to a 5.0% elongation state is 15 N/cm or more.

It is preferable that a total fineness of threads that constitute the fabric is 280 to 940 dtex.

It is preferable that a single fiber fineness of threads that constitute the fabric is 1.0 to 8.0 dtex.

Also, the present invention relates to an air bag including the above-described fabric for an air bag.

Also, an air bag according to the present invention includes a first air bag base cloth and a second air bag base cloth obtained by cutting any of the above-described fabrics for an air bag into a predetermined shape, and the first air bag base cloth is provided with an inflator mounting port, and peripheries of the two air bag base cloths are sewn together.

In the above-described air bag, the two air bag base cloths can be stacked such that weaving directions of the two air bag base cloths intersect each other.

In the above-described air bags, at least one reinforcement cloth that is formed into an annular shape can be attached to the first air bag base cloth so as to cover a periphery of the inflator mounting port of the first air bag base cloth.

In the above-described air bag, a weaving direction of the reinforcement cloth can intersect the weaving direction of the first air bag base cloth.

In the above-described air bag, the at least one reinforcement cloth can be formed using any of the above-described fabrics for an air bag.

Advantageous Effects of Invention

According to the present invention, it is possible to provide an air bag that has a sufficient strength and gas-impermeability, and in which threads that constitute the fabric that forms the airbag are unlikely to enlarge even when the inside of the air bag has a high pressure.

DESCRIPTION OF EMBODIMENTS

Figure 1:
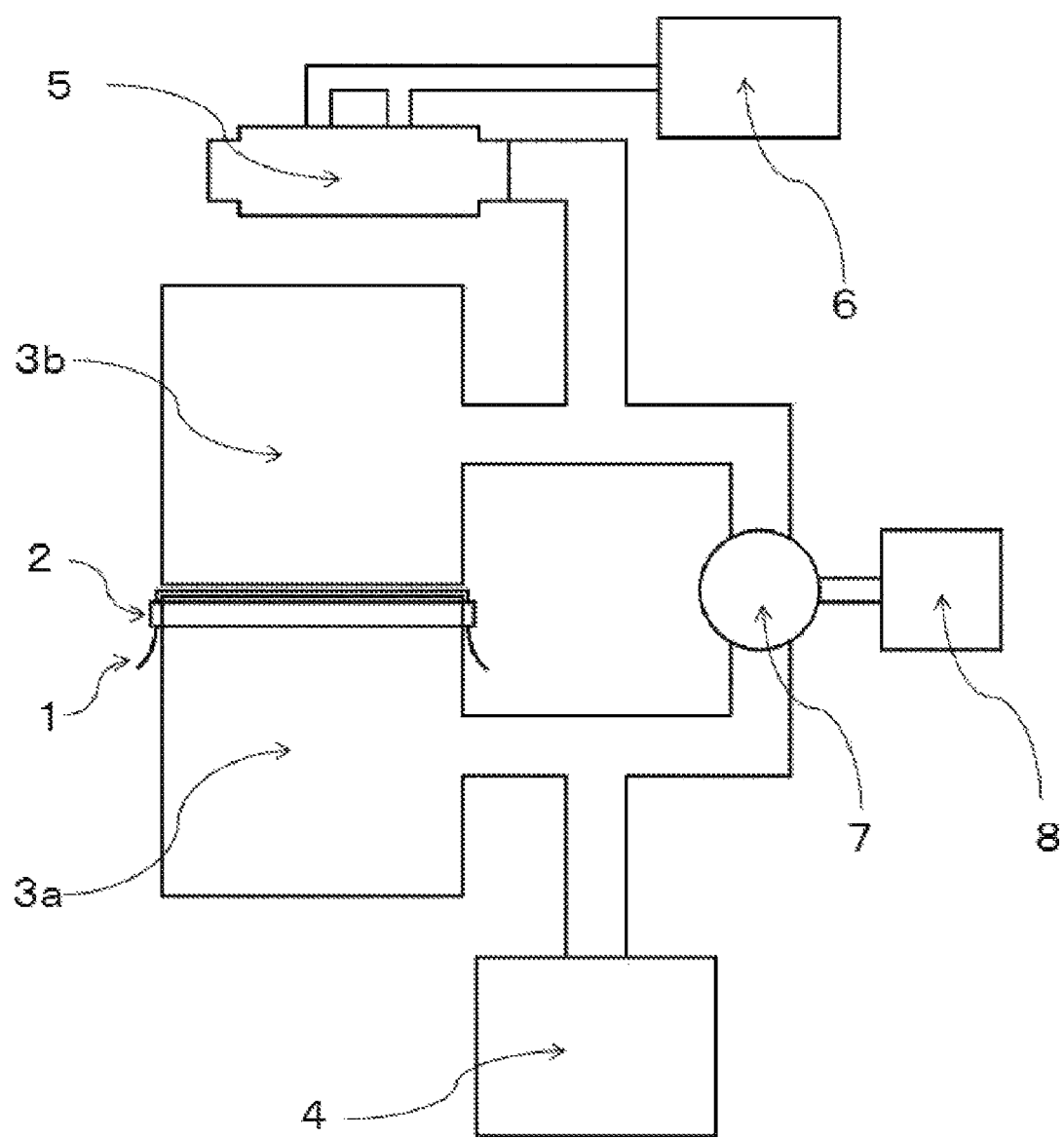
FIG. 1 is a schematic diagram of a greige air permeability measurement apparatus.

In a fabric for an airbag of the present invention, both the warp and the weft have a tensile strength of 600 N/cm or more, and the air flow rate of the fabric under a differential pressure of 20 kPa is 1.0 L/cm$^2$·min or less, an average stress of the warp and the weft that is required to additionally elongate the fabric from a 1.0% elongation state to a 3.0% elongation state is 15 N/cm or more, and an average stress of the warp and the weft that is required to additionally elongate the fabric from the 3.0% elongation state to a 5.0% elongation state is 15 N/cm or more. Hereinafter, details will be described.

(1) Tensile Strength

It is important for the tensile strength of the warp and the weft of the fabric to be 600 N/cm or more. If the tensile strength is 600 N/cm or more, the fabric can sufficiently withstand impact caused when the power of an inflator increases due to the air bag being placed in a high temperature environment such as summer.

(2) Air Flow Rate

Also, it is important for the air flow rate of the fabric under a differential pressure of 20 kPa to be 1.0 L/cm$^2$·min or less. By setting the air flow rate to 1.0 L/cm$^2$·min or less, it is possible to deploy the air bag without losing gas ejected from the inflator and to obtain a deployment speed that is appropriate to quickly protect an occupant.

(3) Stress Required at the Time of Elongation

Furthermore, the stress required to elongate a fabric is set in two stages. This is because of the following reasons. Specifically, when a folded air bag is filled with gas and deploys, the apparent volume is small immediately after deployment, and thus the internal pressure of the air bag increases temporarily. This pressure is referred to as "primary pressure". Thereafter, when the air bag expands and folding of the air bag is released, the volume of the air bag increases, and thus the internal pressure decreases temporarily, but the internal pressure increases again along with the air bag being filled with gas. This pressure is referred to as "secondary pressure". Thus, when the air bag deploys, the pressure changes in two stages, and thus the stress required for elongation also needs to be examined in two stages. In view of this, in the present invention, the stress required to additionally elongate the fabric from a 1.0% elongation state to a 3.0% elongation state and the stress required to additionally elongate the fabric from the 3.0% elongation state to a 5.0% elongation state are examined separately.

Specifically, it is important that an average stress of the warp and the weft that is required to additionally elongate the fabric from the 1.0% elongation state to the 3.0% elongation state is 15 N/cm or more, and an average stress of the warp and the weft that is required to additionally elongate the fabric from the 3.0% elongation state to the 5.0% elongation state is 15 N/cm or more. More preferably, the average stress of the warp and the weft that is required to additionally elongate the fabric from the 1.0% elongation state to the 3.0% elongation state is 30 N/cm or more, and the average stress of the warp and the weft that is required to additionally elongate the fabric from the 3.0% elongation state to the 5.0% elongation state is 30 N/cm or more. By setting both the stress that is required to additionally elongate the fabric from the 1.0% elongation state to the 3.0% elongation state and the stress that is required to additionally elongate the fabric from the 3.0% elongation state to the 5.0% elongation state to 15 N/cm or more, the fabric does not elongate beyond necessity even when the inside of the air bag has a high pressure, and thus enlargement of gaps between threads can be suppressed appropriately, and gas leakage from the surface of the air bag can be prevented. Also, it is preferable that the average stress of the warp and the weft that is required to additionally elongate the fabric from the 3.0% elongation state to the 5.0% elongation state is 50 N/cm or less. By setting the stress that is required to additionally elongate the fabric from the 3.0% elongation state to the 5.0% elongation state to 50 N/cm or less, the fabric can have appropriate flexibility, and can absorb impact when an occupant comes into contact with the air bag to reduce injury.

(4) Threads that Constitute Fabric

The threads that constitute the fabric of the present invention preferably have a total fineness of 280 dtex or more. If the total fineness of threads is 280 dtex or more, the strength of the fabric becomes more superior as an air bag. Also, the total fineness is preferably 940 dtex or less and more preferably 700 dtex or less because a lightweight fabric can be easily obtained.

The single fibers of the threads that constitute the fabric may have the same fineness or different finenesses, and preferably have a fineness of 1.0 to 8.0 dtex. By setting the fineness of the single fibers to 8.0 dtex or less, it is possible to increase the flexibility of the fabric and improve the foldability of the air bag, and also reduce the breathability. The fineness of the single fibers is preferably 1.0 dtex or more because the single fibers are unlikely to break in the spinning process, the weaving process, and the like.

Also, it is sufficient that the cross-sectional shape of a single fiber is selected from a circle, an ellipse, a flattened shape, a polygon, a hollow shape, other variants, and the like. It is sufficient to use mixed fibers, doubling threads, combined use threads, mixed use threads thereof (the warp and the weft have different cross-sectional shapes), or the like as needed, and to appropriately select the cross-sectional shape to the extent that the fabric physical properties and the like are not hindered.

It is sufficient to select, as needed, as fibers that constitute the fabric, one or more from: aliphatic polyamide fibers obtained by one of or a copolymerization or mixing of nylon 6, nylon 66, nylon 46, nylon 610, nylon 612, or the like; polyamide fibers (typified by nylon 6T, nylon 6I, and nylon 9T) obtained by copolymerization of aliphatic amines and aromatic carboxylic acids; polyester fibers obtained by one of or a copolymerization or mixing of polyethylene terephthalate, polytrimethylene terephthalate, polybutylene terephthalate, or polyethylene naphthalate, polyester fibers, or the like; ultra high molecular weight polyolefin fibers; chlorine-containing fibers made of vinylidene, polyvinyl chloride, or the like; fluorine-containing fibers containing polytetrafluoroethylene; polyacetal fibers; polysulfone fibers; polyphenylene sulfide fibers (PPS); polyether ether ketone fibers (PEEK); wholly aromatic polyamide fibers; wholly aromatic polyester fibers; polyimide fibers; polyetherimide fibers; polyparaphenylene benzbisoxazole fibers (PBO); vinylon fibers; acrylic fibers; cellulose fibers; silicon carbide fibers; alumina fibers; glass fibers; carbon fibers; and steel fibers. Among these, in terms of versatility, and from the viewpoint of the fabric manufacturing process, the fabric physical properties, and the like, aliphatic polyamide fiber, copolymerized polyamide fibers, and polyester fibers are preferable.

One or more of various additives that are used to improve spinnability, processability, durability, and the like of fibers may be used for these fibers, examples including a heat-resistant stabilizer, an antioxidant, a light-resistant stabilizer, an aging resister, a lubricant, a smoothing agent, a pigment, a water repellent agent, an oil-repellent agent, a masking agent such as titanium oxide, a gloss imparting agent, a flame retardant, and a plasticizer. Also, processing such as twisting, bulking processing, crimping processing, winding processing, or gluing processing may be performed if it is desirable to weave a leno weave.

The texture of the fabric may be any of a plain weave, a basket weave, a grid weave (ripstop weave), a twill weave, a cord weave, a leno weave, a mock leno weave, and a composite texture thereof. Beside a two-axis design with warp and weft, a multi-axis design including axes that are inclined at 60 degrees may be adopted as needed, and in this case, the arrangement of threads need only be in conformity with the same arrangement of the warp or the weft. Among these, plain weave is preferable in terms of ensuring the tightness of the structure, the physical properties, and the evenness of the performance.

(5) Cover Factor

The fabric of the present invention preferably has a cover factor of 2100 or more. If the cover factor is 2100 or more, the tightness of the fabric increases and it is possible to obtain a fabric having excellent airtightness. If threads having different total finenesses are used in the warp and the weft, the cover factor of the entire fabric can be obtained by calculating cover factors using the total finenesses of the warp and the weft and summing up the cover factors.

The cover factor (CF) herein is obtained by the product of weave densities N (threads/2.54 cm) of the warp and the weft of a fabric and a total fineness D (dtex).

$$CF = Nw \times \sqrt{Dw} + Nf \times \sqrt{Df}$$

Here, Nw and Nf are weave densities (threads/2.54 cm) of the warp and the weft

Dw and Df are total finenesses (dtex) of the warp and the weft

Also, a fabric on which gas-impermeability processing is performed by forming a layer of rubber, resin, or the like thereon may be used in accordance with the performance of the inflator, the volume of the air bag, the use site, or the like. For this purpose, resin adheres to the entirety of at least one surface of the fabric, but resin may be present on the surfaces of the fabric, gaps between thread bundles that constitute the fabric, gaps between single fibers, or the like.

Examples of the resin include halogen-containing rubbers such as chloroprene rubber, Hypalon rubber, and fluororubber, rubbers such as silicone rubber, ethylene propylene rubber, ethylene propylene terpolymer rubber, nitrile butadiene rubber, styrene butadiene rubber, isobutylene isoprene rubber, urethane rubber, and acrylic rubber, halogen-containing resins such as vinyl chloride resins, vinylidene chloride resins, chlorinated polyolefin resins, and fluororesins, and resins such as urethane resins, acrylic resins, ester resins, amide resins, olefin resins, and silicone resins, and these are used alone or in combination.

Examples of an applying method include 1) a coating method (knife, kiss, reverse, comma, slot die, and slip coater, or the like), 2) an immersion method, 3) a printing method (screen, roll, rotary, gravure, or the like), 4) a transfer method (transfer), 5) a laminate method, and 6) a spraying method using a spray.

An air bag of the present invention can be obtained by joining at least one base cloth obtained by cutting the fabric of the present invention into a predetermined shape (hereinafter, simply referred to as "base cloth"). The number of base cloths that constitute the air bag is one or more. All of the base cloths that constitute the air bag are preferably constituted by the fabric.

It is sufficient to select the specification, shape, and volume of the air bag of the present invention in accordance with the site at which the air bag is to be disposed, the application, accommodation space, the performance of absorbing occupant impact, the output of the inflator, and the like.

Although joining of the base cloths, joining of a base cloth and a reinforcement cloth or a hanging string, and fixing of other cut base cloths are performed mainly by sewing, it is possible to use partial adhesion, welding, or the like in combination, or use a joining method employing weaving or knitting as long as the air bag satisfies the fastness properties, impact resistance at the time of deployment, the performance of absorbing occupant impact, and the like.

It is sufficient that cut base cloths are sewn together using a sewing method that is applied to a general air bag, such as lock stitches, multi-thread chain stitches, one side down stitches, looping, safety stitches, zigzag stitches, flattened stitches, or the like. Also, it is sufficient that the fineness of the sewing thread is 700 dtex (corresponding to #20) to 2800 dtex (corresponding to #0), and the stitch count is 2 to 10 stitches/cm. If stitch lines with a plurality of columns are required, it is sufficient to use a multi-needle sewing machine with the distance between stitch lines being about 2 mm to 8 mm, but if the distance of a sewing portion is not long, sewing may be performed using a single-needle sewing machine a plurality of times. If a plurality of base cloths are used as an air bag body, a plurality of base cloths may be sewn together in a stacked state, or sewn together one by one.

If two air bag base cloths are used, one of the air bag base cloths can be provided with an inflator mounting port and at least one air outlet. The two air bag base cloths can be stacked such that their weaving directions intersect each other (for example, intersect each other at 45 degrees) and the peripheries of the two air bag base cloths are sewn together. At least one annular reinforcement cloth can be attached to the periphery of this mounting port as needed. If a plurality of reinforcement cloths are to be attached, these reinforcement cloths can be stacked on one another and then attached. At this time, the reinforcement cloths can be attached such that the weaving direction of the reinforcement cloths and the weaving direction of the air bag base cloth to which these reinforcement cloths are attached intersect each other (for example, the weaving directions intersect each other at 45 degrees). The reinforcement cloth can be made of a material that is similar to that of the air bag base cloth, and for example, a coated base cloth to which resin such as a silicone resin is applied can be used. Moreover, as described above, if a plurality of reinforcement cloths are used, at least one of them can be used as a coated base cloth.

It is sufficient that the sewing thread used for sewing is selected as appropriate from among threads that are generally called synthetic threads and threads that are used as industrial sewing threads. Examples thereof include nylon 6, nylon 66, nylon 46, polyester, macromolecular polyolefin, fluorine-containing, vinylon, aramid, carbon, glass, and steel threads, and any of spun yarn, filament twisted yarn, or a filament resin processed yarn may be used.

Furthermore, in order to prevent gas leakage from stitches of outer circumferential sewing portions or the like, a sealing material, an adhesive, an adhering material, or the like may be applied to, sprayed onto, or stacked on upper portions and/or lower portions of stitches, gaps between stitches, a margin to seam, or the like.

Also, a heat-resistant protection cloth or a dynamic reinforcement cloth for protection from hot gas may be provided in the periphery of a gas ejection port of an inflator in accordance with the characteristics of the inflator that is used. The protection cloth and reinforcement cloth may be made of a heat resistant material such as a heat resistant fiber material (e.g., wholly aromatic polyamide fibers, wholly aromatic polyester fibers, PBO fibers, polyimide fibers, or fluorine-containing fibers), a fabric that is separately produced using threads that are the same as those of the air bag body or are thicker than those of the air bag body base cloth may be directly used as these protection cloth and reinforcement cloth, or a cloth obtained by applying a heat resistant coating material to one surface or both surfaces of a fabric may be used.

The air bag of the present invention can be applied to applications in passenger cars, commercial vehicles, buses, motorcycles, and the like as various bags for occupant protection, such as side bags and center bags for front collision protection and side collision protection of a driver/passenger seat, headrest bags for rear seat occupant protection (front collision and rear collision) and headrest bags for rear collision protection, knee bags and foot bags for leg and foot protection, mini bags for infant protection (child seats), bag bodies for an air belt, and bags for pedestrian protection, and furthermore, as long as the function requirements are satisfied, the air bag of the present invention can also be applied in multiple applications such as ships, railroad trains, electric railcars, aircraft, and amusement park equipment.

WORKING EXAMPLES

Hereinafter, the present invention will be more specifically described based on working examples, but the present invention is not limited to these working examples. Note that methods for evaluating the properties and performance of a fabric for an air bag that were performed in the working examples will be described below.

Total Fineness of Threads

Measurement was performed in conformity with method B in JIS L 1013 8.3.1.

Number of Thread Filaments

Measurement was performed in conformity with JIS L 1013 8.4.

Single Fiber Fineness

The fineness was obtained by dividing the total fineness by the number of filaments.

Weave Density of Fabric

Measurement was performed in conformity with method A in JIS L 1096 8.6.1.

Tensile Strength of Fabric

Measurement was performed in conformity with method A in JIS L 1096 8.14.1.

Air Flow Rate of Fabric

The air flow rate of the obtained fabric under a differential pressure of 20 kPa was measured using a greige air flow rate measurement device (manufactured by KYOTOSEIKO CO., LTD., a flowmeter 6: DF2810P manufactured by COSMO INSTRUMENTS CO., LTD., a laminar flow tube 5: LF2-100L manufactured by COSMO INSTRUMENTS CO., LTD., and a pressure gauge 8: DP-330BA manufactured by COSMO INSTRUMENTS CO., LTD.) shown in FIG. 1. As shown in FIG. 1, Sample 1 was obtained by cutting the obtained fabric into a 20 cm×20 cm piece, and was fixed, using a ring-shaped fastener 2, to a first tubular clamp 3a having an inner diameter of 50 mm that was connected to a pressure device 4, and was held between the first clamp 3a and a second tubular clamp 3b having an inner diameter of 50 mm that was connected to the laminar flow tube 5. Thereafter, pressure was applied to Sample 1 using the pressure device 4 from the first clamp 3a side, and a pressure adjustment valve 7 was operated such that the pressure gauge 8 displayed 20 kPa. The flow rate of air passing through the sample in the above-described state was detected using the flowmeter 6 that was connected to the laminar flow tube 5, and the detected value was used as the air flow rate under a differential pressure of 20 kPa.

Stress Required for Elongation Between Specific Elongation Percentages

A graph where the vertical axis indicates stress per base cloth width (N/cm) and the horizontal axis indicates the elongation percentage (%) was created based on the results of measurement of elongation percentages in conformity with method A in JIS L 1096 8.14.1, stresses when the elongation percentage was 1.0%, 3.0%, and 5.0% were read out using that graph, the difference between the stress when the elongation percentage was 3.0% and the stress when the elongation percentage was 1.0%, and the difference between the stress when the elongation percentage was 5.0% and the stress when the elongation percentage was 3.0% were obtained, and the former was deemed to be the stress that was required to additionally elongate the fabric from a 1.0% elongation state to a 3.0% elongation state, and the latter was deemed to be the stress that was required to additionally elongate the fabric from the 3.0% elongation state to a 5.0% elongation state.

Air Bag Deployment Test

A deployment test was performed using an inflator having a regular power (having a peak pressure of 200 kPa in a 60 L tank test) and an inflator having a two-fold power (having a peak pressure of 400 kPa in a 60 L tank test). The inflator was inserted into the air bag that was produced using a later-described method and was fixed to a stand for evaluation using a bolt, and then the air bag was folded from the right and left, and the top and bottom so as to overlap itself at the position of the inflator, and the folded airbag was fixed using tape (NICHIBAN cloth adhesive tape No. 121). The inflator was ignited in that state so as to deploy the air bag. An EH5-200 inflator manufactured by Daicel Corporation was used as the inflator for the normal power test, and an FL-400 inflator manufactured by Daicel Corporation was used as the inflator for the two-fold power test.

Evaluation was performed through observation of the internal pressure at the time of deployment and the state of the bag after the test. The case where the maximum internal pressure at a secondary peak in the deployment test in which the normal power inflator was used was less than 25 kPa was evaluated as 1, the case where the maximum internal pressure was 25 kPa or more and less than 30 kPa was evaluated as 2, and the case where the maximum internal pressure was 30 kPa or more was evaluated as 3. Also, the case where an air bag had an abnormality such as a tear after the deployment test in which a two-fold power inflator was used was evaluated as A, and the case where an air bag had no abnormality was evaluated as B.

Method for Producing Air Bag for Deployment Test

Figure 2:
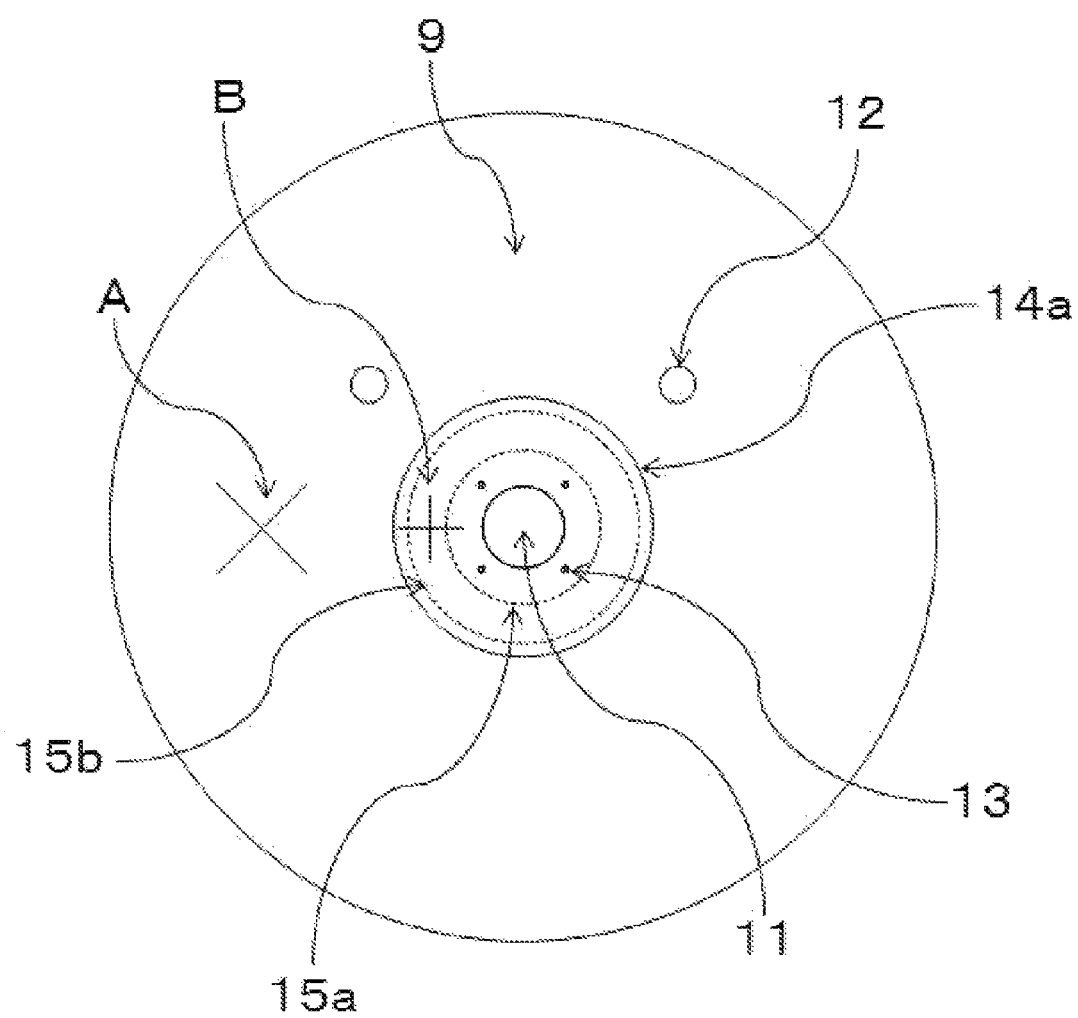
FIG. 2 is a front view showing a state in which three annular cloths are sewn to amounting port main body base cloth of an air bag for deployment test.

A method for producing an air bag for deployment test will be described below with reference to FIGS. 2 to 5. A first circular main body base cloth 9 having a diameter of 670 mm and a second circular main body base cloth 10 having a diameter of 670 mm were cut from a prepared fabric. As shown in FIG. 2, the first main body base cloth 9 was provided in its central portion with an inflator mounting port 11 having a diameter of 67 mm and two air outlets 12 having a diameter of 30 mm at two positions (left and right pair) located 125 mm up and 115 mm respectively left and right from the center of the mounting port 11. Furthermore, the first main body base cloth 9 was provided with bolt fixing holes 13 having a diameter of 5.5 mm at positions located 34 mm up and down and 34 mm left and right from the center of the mounting port. Note that the second main body base cloth 10 was oriented toward the occupant side, and was not provided with mounting holes, air outlets, or bolt fixing holes.

Also, a non-coated base cloth that was produced using 470 dtex, 72f nylon 66 fibers and had a weave density of 53/2.54 cm and a coated base cloth that was obtained by coating a base cloth having a weave density of 46/2.54 cm with a silicone resin in 45 g/m$^2$ were prepared as the reinforcement cloths. Three annular cloths 14a having an outer diameter of 210 mm and an inner diameter of 67 mm were cut from the non-coated base cloth, and one annular cloth 14b having the same shape as the annular cloth 14a was cut from the coated base cloth as the reinforcement cloths for the inflator mounting port.

Figure 3:
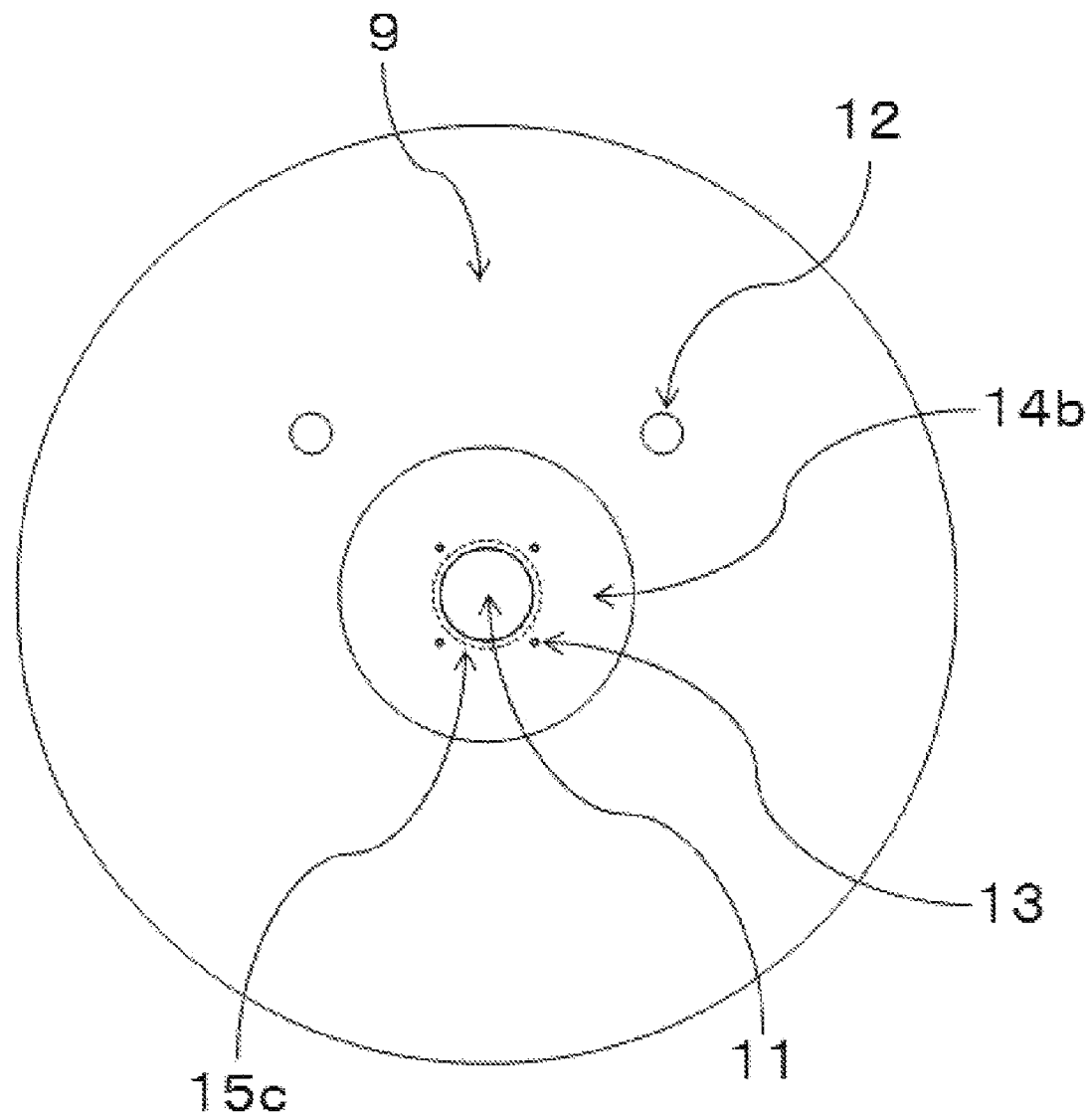
FIG. 3 is a front view showing a state in which four annular cloths are sewn to a mounting port main body base cloth of an air bag for deployment test.

All of the annular cloths 14a and 14b were provided with bolt fixing holes having a diameter of 5.5 mm at positions corresponding to the bolt fixing holes 13 of the first main body base cloth 9. Moreover, the three annular cloths 14a were overlaid on the first main body base cloth 9 provided with the inflator mounting ports such that the weaving direction of the reinforcement cloth was rotated by 45 degrees with respect to the weaving direction of the first main body base cloth 9 and the positions of the bolt fixing holes coincided with each other. Here, A shown in FIG. 2 indicates the weaving direction of the first main body base cloth 9, and B indicates the weaving direction of the annular cloths. Moreover, the cloths were sewn in a circular shape at positions having a diameter of 126 mm (sewing portion 15a) and having a diameter of 188 mm (sewing portion 15b) with the mounting port 11 serving as the center. Furthermore, the annular cloth 14b and the annular cloths 14a having the same shape were overlaid thereon from the above, and the four annular cloths 14a and 14b were sewn to the main body base cloths in a circular shape at a position having a diameter of 75 mm (sewing portion 15c). The main body base cloth 9 after sewing is shown in FIG. 3. Note that the annular cloths were seamed with the main body base cloth through lock stitching using a nylon 66 sewing thread with the needle thread being 1400 dtex and the bobbin thread being 940 dtex with a stitch count of 3.5 stitches/cm.

Figure 4:
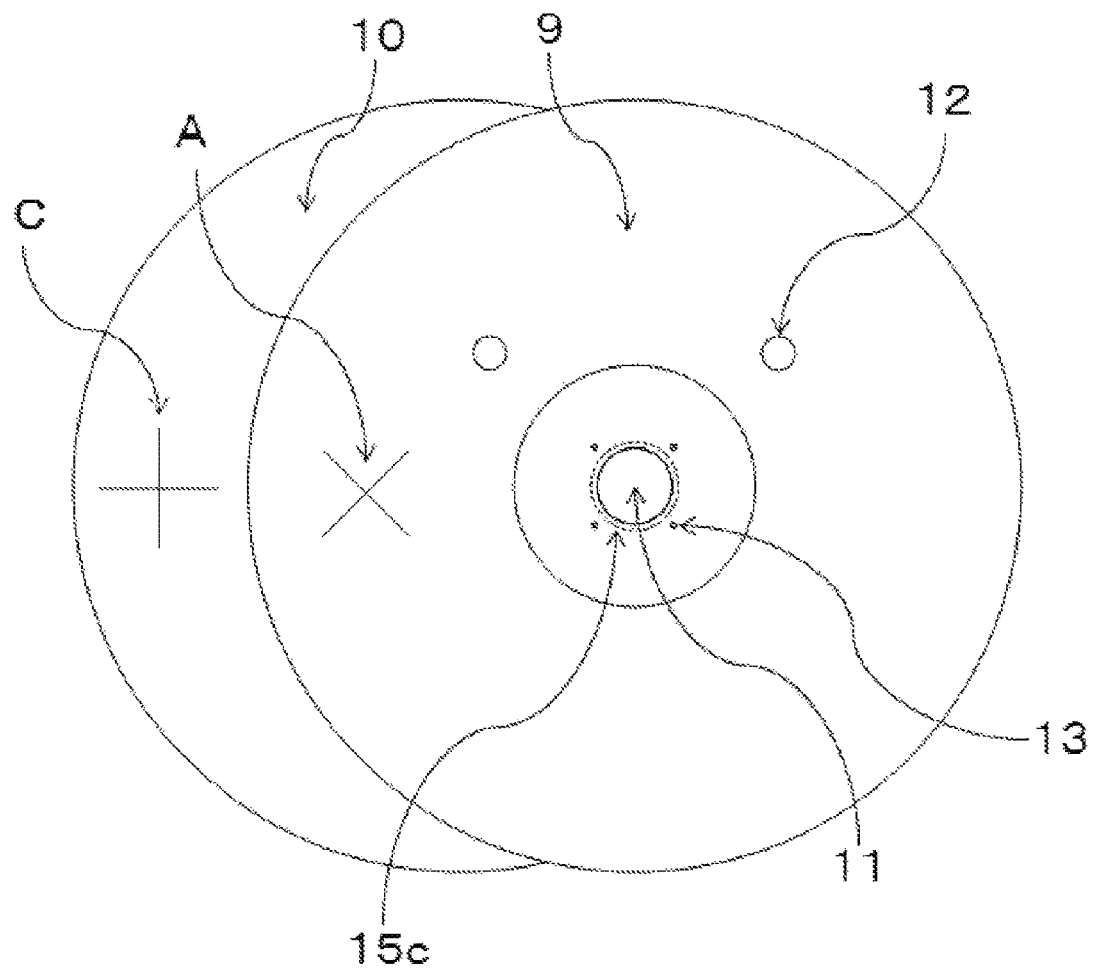
FIG. 4 is a front view showing the manner in which the mounting port main body base cloth of the air bag for deployment test and an occupant main body base cloth are stacked.
Figure 5:
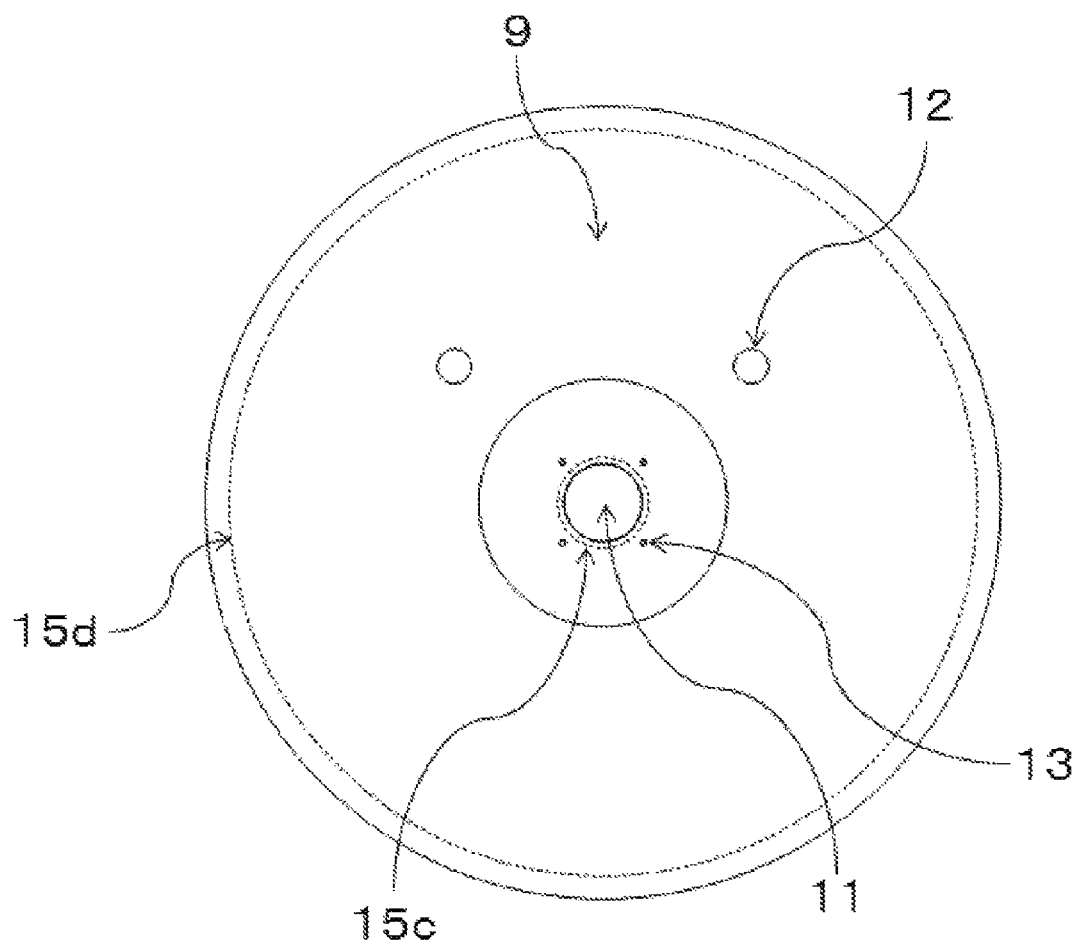
FIG. 5 is a front view showing a state in which the mounting port main body base cloth of the air bag for deployment test and an occupant main body base cloth are sewn together.

Next, the two main body base cloths 9 and 10 were stacked such that the surfaces of the first main body base cloth 9, with which the annular cloths were seamed, were located outside and the weaving direction of the main body base cloth 9 was rotated by 45 degrees with respect to the weaving direction of the main body base cloth 10 (FIG. 4). Here, A shown in FIG. 4 indicates the weaving direction of the first main body base cloth 9, and C indicates the weaving direction of the second main body base cloth 10. Moreover, outer circumferential portions of the overlaid first and second main body base cloths were sewn together through double thread chain stitching with two rows (sewing portion 15d) at a distance between stitch lines of 2.4 mm and a margin to the seam of 20 mm. The sewn state is shown in FIG. 5. The bag was drawn from the mounting port 11, and the inside and the outside was flipped after sewing so as to obtain a circular air bag having an inner diameter ra of 630 mm. A sewing thread that was the same as the above-described thread used in lock stitching was used as the sewing thread for sewing the outer circumferential portions.

Working Example 1

A plain woven fabric was produced using nylon 66 threads having a total fineness of 400 dtex, a filament number of 136, and a single fiber fineness of 2.9 dtex for the warp and the weft, and scouring and setting were performed so as to obtain a fabric for an air bag in which both the warp and the weft had a weave density of 55/2.54 cm. The obtained fabric had a tensile strength of 744 N/cm for the warp and 639 N/cm for the weft and had an air flow rate of 0.36 L/cm$^2$·min, and an average stress of the warp and the weft that was required to additionally elongate the obtained fabric from a 1.0% elongation state to a 3.0% elongation state was 15 N/cm, and an average stress of the warp and the weft that was required to additionally elongate the fabric from the 3.0% elongation state to a 5.0% elongation state was 16 N/cm. An air bag was produced using the obtained fabric and the above-described method. The results of the test of deploying that air bag were such that the maximum internal pressure at a secondary peak in the test in which a normal power inflator was used was 26 kPa, and the bag had no abnormality in the test in which a two-fold power inflator was used. The fabric properties and the deployment test results are shown in Table 1.

Working Example 2

A plain woven fabric was produced using nylon 66 threads having a total fineness of 470 dtex, a filament number of 136, and a single fiber fineness of 3.5 dtex for the warp and the weft, and scouring and setting were performed so as to obtain a fabric for an air bag in which both the warp and the weft had a weave density of 53/2.54 cm. The obtained fabric had a tensile strength of 766 N/cm for the warp and 798 N/cm for the weft and had an air flow rate of 0.39 L/cm$^2$·min, and an average stress of the warp and the weft that was required to additionally elongate the obtained fabric from the 1.0% elongation state to the 3.0% elongation state was 17 N/cm, and an average stress of the warp and the weft that was required to additionally elongate the fabric from the 3.0% elongation state to the 5.0% elongation state was 17 N/cm. An air bag was produced using the obtained fabric and the above-described method. The results of the test of deploying that air bag were such that the maximum internal pressure at a secondary peak in the test in which the normal power inflator was used was 29 kPa, and the bag had no abnormality such as a tear in the test in which the two-fold power inflator was used. The fabric properties and the deployment test results are shown in Table 1.

Working Example 3

A plain woven fabric was produced using polyethylene terephthalate threads having a total fineness of 470 dtex, a filament number of 144, and a single fiber fineness of 3.3 dtex for the warp and the weft, and scouring and setting were performed so as to obtain a fabric for an air bag in which the warp had a weave density of 62/2.54 cm and the weft had a weave density of 59/2.54 cm. The obtained fabric had a tensile strength of 755 N/cm for the warp and 705 N/cm for the weft and had an air flow rate of 0.69 L/cm$^2$·min, and an average stress of the warp and the weft that was required to additionally elongate the obtained fabric from the 1.0% elongation state to the 3.0% elongation state was 37 N/cm, and an average stress of the warp and the weft that was required to additionally elongate the fabric from the 3.0% elongation state to the 5.0% elongation state was 31 N/cm. An air bag was produced using the obtained fabric and the above-described method. The results of the test of deploying that air bag were such that the maximum internal pressure at a secondary peak in the test in which the normal power inflator was used was 32 kPa, and the bag had no abnormality such as a tear in the test in which the two-fold power inflator was used. Fabric properties and the deployment test results are shown in Table 1.

Working Example 4

A plain woven fabric was produced using polyethylene terephthalate threads having a total fineness of 560 dtex, a filament number of 96, and a single fiber fineness of 5.8 dtex for the warp and the weft, and scouring and setting were performed so as to obtain a fabric for an air bag in which both the warp and the weft had a weave density of 52/2.54 cm. The obtained fabric had a tensile strength of 784 N/cm for the warp and 757 N/cm for the weft and had an air flow rate of 0.68 L/cm$^2$·min, and an average stress of the warp and the weft that was required to additionally elongate the obtained fabric from the 1.0% elongation state to the 3.0% elongation state was 42 N/cm, and an average stress of the warp and the weft that was required to additionally elongate the fabric from the 3.0% elongation state to the 5.0% elongation state was 43 N/cm. An air bag was produced using the obtained fabric and the above-described method. The results of the test of deploying that air bag were such that the maximum internal pressure at a secondary peak in the test in which the normal power inflator was used was 34 kPa, and the bag had no abnormality such as a tear in the test in which a two-fold power inflator was used. The fabric properties and the deployment test results are shown in Table 1.

Comparative Example 1

A plain woven fabric was produced using nylon 66 threads having a total fineness of 280 dtex, a filament number of 36, and a single fiber fineness of 7.8 dtex for the warp and the weft, and scouring and setting were performed so as to obtain a fabric for an air bag in which both the warp and the weft had a weave density of 68/2.54 cm. Then, an air bag was produced using the obtained fabric and the above-described method. It was conceivable that because the obtained fabric had a low total fineness, the warp had a low tensile strength of 578 N/cm and the weft had a low tensile strength of 567 N/cm. Also, although the total fineness was low, the breathability was 0.83 L/cm$^2$·min due to both the warp and the weft having a high weave density. Thus, the maximum internal pressure at the secondary peak was 27 kPa in the test in which the normal power inflator was used, but the bag tore due to insufficient strength in the test in which the two-fold power inflator was used. The fabric properties and the deployment test results are shown in Table 1.

Comparative Example 2

A plain woven fabric was produced using nylon 66 threads having a total fineness of 700 dtex, a filament number of 108, and a single fiber fineness of 6.5 dtex for the warp and the weft, and scouring and setting were performed so as to obtain a fabric for an air bag in which both the warp and the weft had a weave density of 42/2.54 cm. Then, an air bag was produced using the obtained fabric and the above-described method. It was conceivable that because the obtained fabric had a high modulus per thread due to a high single fiber fineness and a high total fineness, gaps formed in the thickness direction of the fabric. Thus, the air flow rate was as high as 1.63 L/cm$^2$·min and the maximum internal pressure at the secondary peak in the test in which the normal power inflator was used was as low as 22 kPa. However, no problems arose in the deployment test due to a high single fiber fineness and a high total fineness. The fabric properties and the deployment test results are shown in Table 1.

Comparative Example 3

A plain woven fabric was produced using nylon 66 threads having a total fineness of 350 dtex, a filament number of 108, and a single fiber fineness of 3.2 dtex for the warp and the weft, and scouring and setting were performed so as to obtain a fabric for an air bag in which the warp had a weave density of 63/2.54 cm and the weft had a weave density of 61/2.54 cm. Then, an airbag was produced using the obtained fabric and the above-described method. The obtained fabric had a low total fineness and a relatively low single fiber fineness, and thus the average stress of the warp and the weft that was required to additionally elongate the fabric from the 1.0% elongation state to the 3.0% elongation state was as low as 12 N/cm, and the average stress of the warp and the weft that was required to additionally elongate the fabric from the 3.0% elongation state to the 5.0% elongation state was as low as 13 N/cm. Also, the maximum internal pressure at the secondary peak in the test in which the normal power inflator was used was as low as 22 kPa, and in the test in which the two-fold power inflator was used, enlargement between threads caused by melting was found, the enlargement being thought to be caused by a high temperature gas passing through the threads that enlarged at the time of deployment. The fabric properties and the deployment test results are shown in Table 1.

TABLE 1

|  |  | Work. Ex. 1 | Work. Ex. 2 | Work. Ex. 3 | Work. Ex. 4 | Comp. Ex. 1 | Comp. Ex. 2 | Comp. Ex. 3 |
| --- | --- | --- | --- | --- | --- | --- | --- | --- |
| Total fineness | dtex | 400 | 470 | 470 | 560 | 280 | 700 | 350 |
| Filament number |  | 136 | 136 | 144 | 96 | 36 | 108 | 108 |
| Single fiber fineness | dtex | 2.9 | 3.5 | 3.3 | 5.8 | 7.8 | 6.5 | 3.2 |
| Weave density warp | #/2.54 cm | 55 | 53 | 62 | 52 | 68 | 42 | 63 |
| weft | #/2.54 cm | 55 | 53 | 59 | 52 | 68 | 42 | 61 |

TABLE 1-continued

|  |  |  | Work. Ex. 1 | Work. Ex. 2 | Work. Ex. 3 | Work. Ex. 4 | Comp. Ex. 1 | Comp. Ex. 2 | Comp. Ex. 3 |
|---|---|---|---|---|---|---|---|---|---|
| Tensile strength | warp | N/cm | 774 | 766 | 755 | 784 | 578 | 835 | 653 |
|  | weft | N/cm | 639 | 798 | 705 | 757 | 567 | 889 | 656 |
| Cover factor |  |  | 2200 | 2298 | 2623 | 2461 | 2276 | 2222 | 2320 |
| Air flow rate |  | L/cm$^2$·min | 0.36 | 0.39 | 0.69 | 0.68 | 0.83 | 1.63 | 0.53 |
| Stress required for additional elongation from 1.0% to 3.0% | warp | N/cm | 15 | 14 | 19 | 25 | 10 | 12 | 9 |
|  | weft | N/cm | 15 | 20 | 55 | 59 | 20 | 27 | 15 |
|  | average | N/cm | 15 | 17 | 37 | 42 | 15 | 19.5 | 12 |
| Stress required for additional elongation from 3.0% to 5.0% | warp | N/cm | 14 | 12 | 18 | 26 | 11 | 12 | 9 |
|  | weft | N/cm | 18 | 22 | 44 | 60 | 21 | 28 | 17 |
|  | average | N/cm | 16 | 17 | 31 | 43 | 16 | 20 | 13 |
| Deployment test (normal power) |  |  | 2 | 2 | 3 | 3 | 2 | 1 | 1 |
| Max. inner pressure at secondary peak (kPa) |  |  | 26 | 29 | 32 | 34 | 27 | 22 | 22 |
| Deployment test (2-fold power) |  |  | B | B | B | B | A | B | A |

LIST OF REFERENCE NUMERALS

9 First main body base cloth
10 Second main body base cloth
11 Inflator mounting port
12 Air hole
13 Bolt fixing hole
14a, 14b Annular cloth
15a, 15b, 15c, 15d Sewing portion
A Weaving direction of first main body base cloth 9
B Weaving direction of annular cloth
C Weaving direction of second main body base cloth 10

The invention claimed is:

1. A fabric for an air bag constituted by synthetic fibers, wherein warp and weft have a tensile strength of 600 N/cm or more,
an air flow rate under a differential pressure of 20 kPa is 1.0 L/cm$^2$·min or less,
an average stress of the warp and the weft that is required to additionally elongate the fabric from a 1.0% elongation state to a 3.0% elongation state is 30 N/cm or more,
an average stress of the warp and the weft that is required to additionally elongate the fabric from the 3.0% elongation state to a 5.0% elongation state is 30 N/cm or more,
a total fineness of threads that constitute the fabric is 280 to 940 dtex,
a single fiber fineness of threads that constitute the fabric is 1.0 to 8.0 dtex, and
the fabric has a cover factor of 2200 or more.

2. An air bag comprising:
the fabric for an air bag according to claim 1.

3. An air bag comprising:
a first air bag base cloth and a second air bag base cloth obtained by cutting the fabric for an air bag according to claim 1 into a predetermined shape,
wherein the first air bag base cloth is provided with an inflator mounting port, and
peripheries of the two air bag base cloths are sewn together.

4. The air bag according to claim 3, further comprising:
at least one reinforcement cloth that is attached to the first air bag base cloth and is formed into an annular shape so as to cover a periphery of the inflator mounting port of the first air bag base cloth.

5. The air bag according to claim 4,
wherein the at least one reinforcement cloth is formed using a fabric for an air bag constituted by synthetic fibers,
wherein warp and weft have a tensile strength of 600 N/cm or more,
an air flow rate under a differential pressure of 20 kPa is 1.0 L/cm$^2$·min or less,
an average stress of the warp and the weft that is required to additionally elongate the fabric from a 1.0% elongation state to a 3.0% elongation state is 15 N/cm or more, and
an average stress of the warp and the weft that is required to additionally elongate the fabric from the 3.0% elongation state to a 5.0% elongation state is 15 N/cm or more.

* * * * *